Patented Oct. 28, 1952

2,615,206

UNITED STATES PATENT OFFICE 2,615,206

DEWATERING THERMOPLASTIC RESINOUS MATERIALS

Paul M. Lindstedt, Akron, Ohio, assignor to Wingfoot Corporation, Akron, Ohio, a corporation of Delaware No Drawing. Application May 20, 1949, Serial No. 94,525

26 Claims. (Cl. 18—47.5)

This invention relates to a method of treating solids, and more particularly, relates to a method of removing liquid from a form-sustaining solid by non-evaporative methods.

In the production of solid compositions of matter through the reaction of one or more components in a liquid phase, the removal of the solid composition from the liquid phase or the liquid from the solid phase is a difficult operation. For example, the removal of a large part of the liquid, such as water, from a solid, such as a resin, prepared by the emulsion polymerization of the reacting monomers may be accomplished by first precipitating the resulting latex of discrete colloidal particles to form a slurry and then filtering the slurry to form a filter cake. The water remaining in the resulting filter cake may then be removed by conventional drying through evaporation with heated air. This process is expensive and time-consuming. In the process of evaporating the water from the filter cake, a crust develops on the surface of the filter cake, making it difficult to remove the water from the interior of the cake. Another method for removing liquid from the slurry is to heat the slurry to agglomerate the particles of the slurry followed by filtration of the agglomerated slurry and evaporative drying of the filter cake. But the dried resin recovered in this manner has poor physical structure in that it is a fine dusty powder which is difficult to handle under many conditions of treatment. Drastic means are required to compact the fine dusty powder into pellets or similar shapes desirable for ease of handling. When such means are used, the resin so treated is compacted into a hard non-porous mass with the result that the resin is difficultly soluble in most solvents.

A process has now been discovered whereby the liquid may be removed from the mass of discrete particles in a more facile, efficient and economical manner than heretofore known. The process of this invention comprises maintaining a form-sustaining mixture containing water and a thermoplastic resinous precipitated irreversible colloid at a temperature above the agglomeration temperature of the resinous material to remove a substantial portion of the water in the liquid state. The remaining moisture may be removed by conventional drying means.

A particular resin which is difficult to recover in the dry state is the resin resulting from the emulsion polymerization of a mixture comprising a conjugated diene hydrocarbon monomer and particularly, butadiene-1,3 and a vinyl aromatic monomer, particularly, styrene. The latex of the resinous copolymer of these monomers is precipitated or flocculated to form a slurry or paste of discrete agglomerates of colloidal particles. If the slurry contains too much water to be form-sustaining, the slurry is treated to remove excess water at a temperature below the agglomeration temperature of the resin until a mass of discrete particles is obtained having a consistency which will permit the mass to be shaped or formed into a self-sustaining or form-sustaining mass. This form-sustaining mass is then maintained at a temperature above the agglomeration temperature of the resin until additional liquid is removed in the liquid state. If the resulting slurry is form-sustaining, i. e. a paste, then there is no need to remove excess water and the paste is heated at or above the agglomeration temperature of the resin to remove additional water in the liquid state.

The process of the present invention will now be described with respect to a specific thermoplastic resinous precipitated irreversible colloid and resulting from the emulsion polymerization of a mixture comprising styrene and butadiene-1,3.

Example 1

85 parts of styrene and 0.1 part of dodecyl mercaptan dispersed in an aqueous medium was copolymerized with 15 parts of butadiene-1,3 in the presence of a water phase comprising 200 parts of water, 5 parts of sodium rosinate, and 0.1 part of potassium persulphate at a temperature of 125° F. for a period of time sufficient to form a latex having a solids content of 32.5% after which 0.5% of phenyl beta naphthylamine was introduced to stop the reaction and function as an antioxidant for the finished product. The latex was precipitated by the addition of a 3% commercial alum solution to form a slurry of the resin.

This slurry containing 8 to 10% solids was filtered at 80° F. which is below the agglomeration temperature of the resin of 132 to 137° F. on a rotary vacuum filter drum. The resulting filter cake contained 400% moisture on a bone dry basis. The filter cake was shaped by forcing the cake through a grid having 1/4" diameter openings spaced on 3/8" centers. The grid formed the resin into rods of 1/4" diameter and varying length depending on the distance the resin was pushed through the grid before the rod broke off under its own weight and generally being 1/8" to 1/2" in length. The resin in rod form was then dropped onto an endless belt at a rate sufficient to produce a layer of resin about 4" thick. This 4" bed of resin was then moved into a heating chamber where the resin was heated for five minutes in moist air having a wet bulb temperature of 140° F. and a dry bulb temperature of 150° F. The moist air was passed down through the bed of resin at a velocity of 250 ft. per minute at 0.25″ static pressure drop. The percentage of moisture in the resin prior to heating was 400% on a bone dry basis and after 5 minutes of heating, the percentage of moisture was 120% on a bone dry basis. All but 0.75% on a bone dry basis of the remaining moisture was removed in 26 minutes with the use of heated air having a wet bulb temperature of 102° F. and a dry bulb temperature of 150° F. passing the air down through the bed of resin at a velocity of 250 ft. per minute.

The same resin containing the same percentage of moisture was treated in the same equipment used in the above run but using dry air having a dry bulb temperature of 150° F. At the end of five minutes, only 10% of the total moisture had been removed. It took 44 minutes to remove the same amount of moisture in this run as was removed in the run above in five minutes. It took a total of 74.5 minutes to reduce the moisture content to 0.75% on a bone dry basis as compared to 31 minutes in the run above.

Thus a saving in time of 139% was observed in reducing the moisture content of the filter cake from 400% to 0.75% by using the method of this invention as compared to using conventional drying methods using hot dry air. In addition to this saving in drying time, a lighter colored resin is obtained because the presence of harmful salts soluble in water are removed during the first five minutes of drying since the water is removed as a liquid and not in the form of a vapor. The resulting resin is also lighter in color due to the fact that it is not subjected as long to the drying temperature as is required using conventional drying methods.

*Example 2*

Example 1 was repeated but the 85 styrene-15 butadiene-1,3 copolymer was replaced by the resinous copolymer resulting from the polymerization of a mixture comprising 90 parts of styrene and 10 parts of butadiene-1,3. The resin was heated in moist air at a wet bulb temperature of 155° F. and a dry bulb temperature of 175° F. A saving of 140% in time was observed in drying this resin by means of the process of the present invention as compared to using conventional drying methods using hot dry air.

Polyvinyl chloride resins and vinyl chloride copolymerized with another copolymerizable monomer to form a vinyl chloride copolymer resin are also advantageously treated in accordance with the present invention. The following example shows the treatment of a vinyl chloride copolymer in accordance with the present invention.

*Example 3*

95 parts of vinyl chloride was copolymerized with 5 parts of diethyl maleate in the presence of 0.15 part of potassium persulphate until the reaction was complete. The resulting latex was precipitated with calcium chloride to form a slurry which slurry was then filtered at 80° F. which is a temperature below the agglomeration temperature of the resin of 193° to 195° F. to form a filter cake having a moisture content of 248% on the bone dry basis.

The filter cake was then maintained at 196° F. which is a temperature above the agglomeration temperature of the resin using moist air having a wet bulb temperature of 196° F. which is above the agglomeration temperature of the resin. After 20 minutes of heating under these conditions, 55.7% of the water was removed, the resin then having a moisture content of 110% on the bone dry basis. Using the conventional method of drying employing hot dry air 110% more time was required to remove the same amount of water.

The resulting resin was lighter in color, due to the fact that it was exposed to heating conditions for a relatively short period of time and to the fact that soluble salts were removed during the drying operation.

The same sort of reduction in drying time noted in the above examples may be observed when the process of this invention is applied to polystyrene, acrylonitrile-styrene copolymers especially the resinous copolymer from a 30 acrylonitrile-70 styrene mixture, polyvinyl chloride and similar thermoplastic resins. The reduction in drying time was also observed for copolymers of vinyl chloride and alkyl-substituted maleates, alkyl-substituted fumarates, dimethyl and diethyl maleates and fumarates.

Any thermoplastic resinous precipitated irreversible colloid is advantageously dewatered in accordance with the present invention. Ordinarily the mixture resulting from the precipitation of the latex of a polymerization reaction may not be dewatered in accordance with the present invention because the mixture of resin and water is too thin to be form-sustaining. It is necessary first to remove sufficient liquid from the mixture at a temperature below the agglomeration temperature of the resin to form a self-sustaining or form-sustaining mass of the resin. By unrestrained form-sustaining mass is meant a mass which is capable of being shaped or formed and of retaining the shape or form given it without the aid of a supporting structure such as a mold and the like. Under some conditions of polymerization, the solids content of the latex is sufficient to give a precipitate which may be dewatered by heating above the agglomeration temperature of the resin. Generally, a precipitate of 20 to 30% solids is an ideal form-sustaining mass. Above 30% to 50% the amount of extractable water by means of the present invention becomes progressively less.

When the latex is precipitated to form a slurry and the slurry is dewatered at a temperature below the agglomeration temperature of the resin to form a self-sustaining mass, it is preferred to treat this self-sustaining mass by shaping it into pellets or rods of convenient size. This is done by passing the self-sustaining mass through a forming grid or shaping die provided with the necessary openings. When circular openings are provided, rods are formed which rods then break off into lengths according to the weight each individual rod sustains before it breaks. The self-sustaining mass may also be extruded through a wide but thin die in the form of a solid sheet which is then run upon a belt and carried into a heat chamber. The self-sustaining mass may be shaped into any desired form before it is dewatered in accordance with the present invention.

By agglomeration temperature is meant the temperature at which the resin particles tend to fuse or coalesce. The agglomeration temperature for thermoplastic materials of the type shown in the examples is determined as follows:

1. Prepare a coagulant solution by dissolving 12 grams of aluminum sulfate in 100 cc. of water.

2. Dilute this solution to 2 liters with water which is not higher in temperature than 80° F.

3. Agitate the coagulant solution vigorously.

4. Slowly add 300 cc. of the latex of the material to be tested having approximately 30% solids content.

5. Filter the mixture on a vacuum filter to remove the excess liquid.

6. Carefully transfer the wet solids formed in the filter onto a glass plate so that a flat unbroken surface is presented by the cake.

7. Press a thermocouple, having an aluminum or silver blade at the junction, into the top surface of the wet solid so that the surface temperature is measured.

8. Expose the sample of wet solids, having the imbedded temperature measuring device, to a source of radiant or high frequency energy and heat the material rapidly by adjusting the heat intensity so that surface evaporation is minimized.

9. The first appearance of exuded moisture marks the temperature at which agglomeration begins. The temperature continues to rise during the shrinkage process until moisture is no longer expelled. The temperature at which dewatering is complete is also recorded.

10. The initial and final temperatures observed during the occurrence of the loss of water in the liquid state represents the agglomeration temperature range.

perature and conventional cooling takes place by evaporation. If desired, the evaporation may be prevented by blanketing the material with a layer of saturated air. Another method of heating involves the use of high frequency electricity. Again this method of heating must be applied under conditions in which evaporation from the resinous mass is suppressed. When polyvinyl chloride which has a softening point above 200° F. is dewatered in accordance with the present invention, it is necessary to use pressure equipment since the required temperatures above the agglomeration temperature of polyvinyl chloride is above the water saturation point of air.

Generally a slurry having a solids content of less than 20% does not hold its shape if formed, and often may not even be formed. Slurries having greater than 30% solids are generally impractical to shape. When the slurry of the resin being processed has a solids content above 20%, the filtration step can be eliminated. It is only necessary to filter the slurry when the solids content is at a level which will not permit the mass to take a form.

The resin treated may vary in resinous nature from a hard brittle material to a pliant, flexible material depending upon the amount of each monomer present. All copolymers resulting from the reaction of a mixture of a conjugated diene hydrocarbon monomer and a vinyl aromatic monomer when the vinyl aromatic monomer is

*Typical agglomeration data on some thermoplastic resins*

| Resin | Agglomeration Temperature at which Syneresis Occurs (° F.) | Heat Source |
|---|---|---|
| 1. Copolymer from polymerization of a mixture containing 27 parts by weight of butadiene-1,3 and 73 parts by weight of styrene. | 98-104 | 250 w. Infra-red lamp @ 6¼" from surface of resin. |
| 2. Copolymer from polymerization of a mixture containing 15 parts by weight of butadiene-1,3 and 85 parts by weight of styrene. | 132-137 | Do. |
| 3. Copolymer from polymerization of a mixture containing 10 parts by weight of butadiene-1,3 and 90 parts by weight of styrene. | 143-147 | Do. |
| 4. Copolymer from polymerization of a mixture containing 95 parts by weight of vinyl chloride and 5 parts by weight of diethyl maleate. | 193-195 | 250 w. Infra-red lamp @ 1½" from surface of resin. |

The act of agglomeration does not ordinarily occur at a specific temperature but is observed to occur over a range of temperatures generally over a 5 to 10 degree range. Resins having an agglomeration temperature below 100° F. are adaptable to the present process but are not practical in view of the fact that temperatures below 100° F. approach normal room temperature and therefore it would be necessary to work under reduced conditions of temperature. When moist air is used as the heating medium, resins having an agglomeration temperature above 212° F. are not efficiently treated because under normal conditions it is not possible to raise the wet bulb temperature of the moist air above 212° F. When resins having an agglomeration temperature above 212° F. are to be treated, moist air under pressure must be used or other methods of heating must be employed. An example of another method of heating is the use of infrared light. However, infrared light must be used under conditions in which the heat is sent into the resinous mass at a rate sufficient to overcome the cooling effect brought about by evaporation. If the heat is not introduced at a sufficiently high rate, then the resin is not raised to a temperature above its agglomeration tempresent in an amount between 95 and 70 parts and the diene monomer is present in an amount between 5 and 30 parts, the parts being by weight and based upon the total amount of the reactive monomers present, are thermoplastic and resinous in nature and may be treated in accordance with this invention.

Any conjugated double bond diolefin may be used in making the resin component. Representative suitable diolefins are butadiene-1,3, isoprene, 2,3-dimethyl butadiene-1,3, 2-ethyl butadiene-1,3, 1,3-dimethyl butadiene-1,3, pentadiene-1,3, pentadiene 2,4, 3-methyl pentadiene-2,4, 3,4-dimethyl pentadiene-2,4, the straight chain and branched chain hexadienes, heptadienes and homologs, analogs, and hydrocarbon substitution products of the foregoing. The preferred conjugated double bond diolefin is butadiene-1,3.

The vinyl aromatic monomer of the resin may also be referred to as being an alpha, beta unsaturated aliphatic substituted aromatic monomer, specific examples being styrene, the substituted styrenes, e. g., metachlorostyrene, p-chlorostyrene, isomeric dichlorostyrenes, alkyl styrenes, e. g., methyl styrene, isopropyl styrene, and vinyl napthalene, etc. A particularly desirable class of these monomers is constituted by the vinyl aryl monomers, the preferred member being styrene.

The diene-styrene resin when processed according to the present invention is recovered in the form of porous dust-free rod shaped pellets varying from a white to a cream color. The advantage of the porous dust-free pellets is observed in the paint industry. It is necessary to dissolve the resin in an aromatic solvent such as toluene before it may be formulated into a paint base. The powdery form of resin does not dissolve in the paint solvents but rather tends to ball up and form into lumps which are caused by the gathering together of small quantities of the powdery resin with the attendant formation of a skin coat which insulates the undissolved resin on the inside from the solvent on the outside. This skin coat must be removed by mechanical means or continued stirring or milling in the solvent before the resin is completely dissolved. The porous dust-free pellets produced by the method of this invention quickly become completely saturated with solvent and dissolved because of the capillaries within the pellets which permit the solvent to be drawn within the interior of the pellets causing the swelling of the pellets from the interior as well as at the surface. The conventionally produced resin, after being dissolved by milling, has a viscosity ranging from 20-25 seconds #4 Ford cup for a 20% solution in xylene at 20° C. But the resin produced in accordance with the present invention has a viscosity in the range of 30-38 seconds.

While certain representative embodiments and details have been shown for the purpose of illustrating the invention, it will be apparent to those skilled in this art that various changes and modifications may be made therein without departing from the spirit or scope of the invention.

I claim:

1. The process of removing water from a mixture containing water and a heat-softenable resinous precipitated irreversible colloid capable of spontaneously agglomerating and having an agglomeration temperature above 100° F. which comprises heating the mixture in an atmosphere containing water vapor in amount sufficient to prevent subtantial evaporation of the water in said mixture and having a wet bulb temperature of at least the agglomeration temperature of the resin to cause the resin to agglomerate and thereby force a substantial portion of the water in a liquid state from the resin, and recovering the desired product.

2. The process of removing water from a mixture containing water and a heat-softenable resinous precipitated irreversible colloid capable of spontaneously agglomerating and having an agglomeration temperature above 100° F., which comprises dividing an unrestrained form-substaining mass of the resinous material into a plurality of shaped units at a temperature below its agglomeration temperature, and then heating the shaped units in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

3. The process of removing water from a mixture containing water and a heat-softenable resinous precipitated irreversible colloid capable of spontaneously agglomerating and having an agglomeration temperature above 100° F. resulting from the aqueous emulsion polymerization of a mixture comprising a conjugated diene monomer and a vinyl aryl monomer, which comprises dividing an unrestrained form-substaining mass of the resinous material into a plurality of shaped units at a temperature below its agglomeration temperature, and then heating the shaped units in moist air having a wet bulb temperature of at least the agglomeration temperature of the resin to cause the resin to agglomerate and thereby force a substantial portion of the water in a liquid state from the resin, and recovering the desired product.

4. The process of removing water from a mixture containing water and a heat-softenable resinous precipitated irreversible colloid capable of spontaneously agglomerating and resulting from the aqueous emulsion polymerization of a mixture comprising butadiene-1,3 and a vinyl aryl monomer, which comprises dividing an unrestrained form-sustaining mass of the resinous material into a plurality of shaped units at a temperature below its agglomeration temperature, and then heating the shaped units in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

5. The process of removing water from a mixture containing water and a heat-softenable resinous precipitated irreversible colloid capable of spontaneously agglomerating and resulting from the aqueous emulsion polymerization of a mixture comprising a conjugated diene monomer and styrene, which comprises dividing an unrestrained form-sustaining mass of the resinous material into a plurality of shaped units at a temperature below its agglomeration temperature, and then heating the shaped units in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

6. The process of removing water from a mixture containing water and a heat-softenable resinous precipitated irreversible colloid capable of spontaneously agglomerating and resulting from the aqueous emulsion polymerization of a mixture comprising butadiene-1,3 and styrene, which comprises dividing an unrestrained form-sustaining mass of the resinuous material into a plurality of shaped units at a temperature below its agglomeration temperature, and then heating the shaped units in moist air having a wet bulb temperature of at least the agglomeration temperature of the resin to cause the resin to agglomerate and thereby force a substantial portion of the water in a liquid state from the resin, and recovering the desired product.

7. The process of removing water from a mixture containing water and a heat-softenable resinous precipitated irreversible colloid capable of spontaneously agglomerating and resulting from the aqueous emulsion polymerization of a mixture comprising 10 to 20 parts of butadiene-1,3 and 90 to 80 parts of styrene, which comprises dividing an unrestained form-sustaining mass of the resinous material into a plurality of shaped units at a temperature below its agglomeration temperature, and then heating the shaped units in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

8. The process of removing water from a mixture containing water and a heat-softenable resinous precipitated irreversible colloid resulting from the aqueous emulsion polymerization of a mixture comprising 15 parts of butadiene-1,3 and 85 parts of styrene, which comprises dividing an unrestrained form-sustaining mass of the resinous material into a plurality of shaped units at a temperature below its agglomeration temperature, and then heating the shaped units in moist air having a wet bulb temperature of at least the agglomeration temperature of the resin to cause the resin to agglomerate and thereby force a substantial portion of the water in a liquid state, from the resin, and recovering the desired product.

9. The process of removing water from a mixture containing water and a heat-softenable resinous precipitated irreversible colloid resulting from the aqueous emulsion polymerization of a mixture comprising 15 parts of butadiene-1,3 and 85 parts of styrene, which comprises dividing an unrestrained form-sustaining mass of the resinous material into a plurality of rod shaped units at a temperature below its agglomeration temperature, and then heating the rod shaped units in air having a wet bulb temperature of about 140° F. and a dry bulb temperature of 150° F. to cause the resin to agglomerate and thereby force a substantial portion of the water in a liquid state from the resin, and recovering the desired product.

10. The process of removing water from a mixture containing water and a heat-softenable resinous precipitated irreversible colloid resulting from the aqueous emulsion polymerization of a mixture comprising 10 parts of butadiene-1,3 and 90 parts of styrene, which comprises dividing an unrestrained form-sustaining mass of the resinous material into a plurality of shaped units at a temperature below its agglomeration temperature, and then heating the shaped units in moist air having a wet bulb temperature of at least the agglomeration temperature of the resin to cause the resin to agglomerate and thereby force a substantial portion of the water in a liquid state from the resin, and recovering the desired product.

11. The process of removing water from a mixture containing water and a heat-softenable resinous precipitated irreversible colloid resulting from the aqueous emulsion polymerization of a mixture comprising 10 parts of butadiene-1,3 and 90 parts of styrene, which comprises dividing an unrestrained form-sustaining mass of the resinous material into a plurality of rod shaped units at a temperature below its agglomeration temperature, and then heating the rod shaped units in air having a wet bulb temperature of about 155° F. and a dry bulb temperature of 170° F. to cause the resin to agglomerate and thereby force a substantial portion of the water in a liquid state from the resin, and recovering the desired product.

12. The process of removing water from a mixture containing water and a heat-softenable resinous precipitated irreversible colloid capable of spontaneously agglomerating and having an agglomeration temperature above 100° F. resulting from the aqueous emulsion polymerization of a conjugated diene monomer and a vinyl aryl monomer, which comprises heating the resinous material in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

13. The process of removing water from a mixture containing water and a heat-softenable resinous precipitated irreversible colloid capable of spontaneously agglomerating and resulting from the aqueous emulsion polymerization of a conjugated diene monomer and styrene, which comprises heating the resinous material in moist air having a wet bulb temperature of at least the agglomeration temperature of the resin to cause the resin to agglomerate and thereby force a substantial portion of the water in a liquid state from the resin, and recovering the desired product.

14. The process of removing water from a mixture containing water and a heat-softenable resinous precipitated irreversible colloid capable of spontaneously agglomerating and resulting from the aqueous emulsion polymerization of butadiene-1,3 and a vinyl aryl monomer, which comprises heating the resinous material in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

15. The process of removing water from a mixture containing water and a heat-softenable resinous precipitated irreversible colloid capable of spontaneously agglomerating and resulting from the aqueous emulsion polymerization of butadiene-1,3 and styrene, which comprises heating the resinous material in moist air having a wet bulb temperature of at least the agglomeration temperature of the resin to cause the resin to agglomerate and thereby force a substantial portion of the water in a liquid state from the resin, and recovering the desired product.

16. The process of removing water from a mixture containing water and a heat-softenable resinous precipitated irreversible colloid capable of spontaneously agglomerating and resulting from the aqueous emulsion polymerization of a mixture comprising 10 to 20 parts of butadiene-1,3 and 90 to 80 parts of styrene, which comprises heating the resinous material in an atmosphere containing water vapor in amount sufficient to prevent substantial evaporation of the water in said mixture and having a wet bulb temperature of at least the agglomeration temperaerate and thereby force a substantial portion of the water in a liquid state from the resin, and recovering the desired product.

17. The process of removing water from a mixture containing water and a heat-softenable resinous precipitated irreversible colloid resulting from the aqueous emulsion polymerization of a mixture comprising 15 parts of butadiene-1,3 and 85 parts of styrene, which comprises heating the resinous material in moist air having a wet bulb temperature of at least the agglomeration temperature of the resin to cause the resin to agglomerate and thereby force a substantial portion of the water in a liquid state from the resin, and recovering the desired product.

18. The process of removing water from a mixture containing water and a heat-softenable resinous precipitated irreversible colloid resulting from the aqueous emulsion polymerization of a mixture comprising 15 parts of butadiene-1,3 and 85 parts of styrene, which comprises heating the resinous material in air having a wet bulb temperature of about 140° F. and a dry bulb temperature of 150° F. to cause the resin to agglomerate and thereby force a substantial portion of the water in a liquid state from the resin, and recovering the desired product.

19. The process of removing water from a mixture containing water and a heat-softenable resinous precipitated irreversible colloid resulting from the aqueous emulsion polymerization of a mixture comprising 10 parts of butadiene-1,3 and 90 parts of styrene, which comprises heating the resinous material in moist air having a wet bulb temperature of at least the agglomeration temperature of the resin to cause the resin to agglomerate and thereby force a substantial portion of the water in a liquid state from the resin, and recovering the desired product.

20. The process of removing water from a mixture containing water and a heat-softenable resinous precipitated irreversible colloid resulting from the aqueous emulsion polymerization of a mixture comprising 10 parts of butadiene-1,3 and 90 parts of styrene, which comprises heating the resinous material in air having a wet bulb temperature of about 155° F. and a dry bulb temperature of 175° F. to cause the resin to agglomerate and thereby force a substantial portion of the water in a liquid state from the resin, and recovering the desired product.

21. The process of removing water from a mixture containing water and a heat-softenable resinous precipitated irreversible colloid capable of spontaneously agglomerating and having an agglomeration temperature above 100° F. and resulting from the aqueous emulsion polymerization of a mixture comprising vinyl chloride, which comprises heating the mixture in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

22. The process of removing water from a mixture containing water and a heat-softenable resinous precipitated irreversible colloid capable of spontaneously agglomerating and having an agglomeration temperature above 100° F. and resulting from the aqueous emulsion polymerization of a mixture comprising vinyl chloride and a dialkyl maleate, which comprises heating the mixture in moist air having a wet bulb temperature of at least the agglomeration temperature of the resin to cause the resin to agglomerate and thereby force a substantial portion of the water in a liquid state from the resin, and recovering the desired product.

23. The process of removing water from a mixture containing water and a heat-softenable resinous precipitated irreversible colloid capable of spontaneously agglomerating and having an agglomeration temperature above 100° F. and resulting from the aqueous emulsion polymerization of a mixture comprising vinyl chloride and a dialkyl fumarate, which comprises heating the mixture in an atmosphere containing water vapor in amount sufficient to prevent substantial evaporation of the water in said mixture and having a wet bulb temperature of at least the agglomeration temperature of the resin to cause the resin to agglomerate and thereby force a substantial portion of the water in a liquid state from the resin, and recovering the desired product.

24. In the process of removing water from a resinous irreversible colloid capable of spontaneously agglomerating and formed from an aqueous emulsion and precipitated at a temperature below its agglomeration temperature, the steps of heating the precipitate in moist air at a temperature of at least the agglomeration temperature of the resin to cause the resin to agglomerate and thereby force a substantial portion of the water in a liquid state from the resin, and recovering the desired product.

25. In the process of removing water from a resinous irreversible colloid capable of spontaneously agglomerating and formed from an aqueous emulsion and precipitated at a temperature below its agglomeration temperature, the steps of dividing an unrestained form-sustaining mass of the resin into a plurality of shaped units at a temperature below its agglomeration temperature and then heating the shaped units in an atmosphere containing water vapor in amount sufficient to prevent substantial evaporation of the water in said mixture and having a wet bulb temperature of at least the agglomeration temperature of the resin to cause the resin to agglomerate, thereby forcing a substantial portion of the water in a liquid state from the resin, and recovering the desired product.

26. A resinous material shaped into a pellet capable of being dissolved in a solvent for the material, the material being substantially free of water soluble salts and containing voids resulting from the removal of water in the liquid state from the material by heating the material at a temperature of at least its agglomeration temperature after the material has been formed from an aqueous emulsion and precipitated at a temperature below its agglomeration temperature.

PAUL M. LINDSTEDT.

REFERENCES CITED

The following references are of record in the file of this patent:

UNITED STATES PATENTS

| Number | Name | Date |
|---|---|---|
| 1,494,830 | Cook | May 20, 1924 |
| 1,803,767 | O'Keeffe | May 5, 1931 |
| 2,083,211 | Alderfer | June 8, 1937 |
| 2,477,316 | Sparks et al. | July 26, 1949 |